United States Patent [19]

Thatte et al.

[11] Patent Number: 4,985,829
[45] Date of Patent: Jan. 15, 1991

[54] CACHE HIERARCHY DESIGN FOR USE IN A MEMORY MANAGEMENT UNIT

[75] Inventors: Satish M. Thatte, Richardson; Donald W. Oxley, Carrollton, both of Tex.

[73] Assignee: Texas Instruments Incorporated, Dallas, Tex.

[21] Appl. No.: 68,788

[22] Filed: Jun. 26, 1987

Related U.S. Application Data

[63] Continuation of Ser. No. 636,190, Jul. 31, 1984, abandoned.

[51] Int. Cl.⁵ .................................. G06F 12/10
[52] U.S. Cl. ................................... 364/200
[58] Field of Search ... 364/200 MS File, 900 MS File

[56] References Cited

U.S. PATENT DOCUMENTS

| | | | |
|---|---|---|---|
| 3,588,839 | 6/1971 | Belady | 364/200 |
| 3,685,020 | 8/1972 | Meade | 364/200 |
| 3,902,163 | 8/1975 | Amdahl et al. | 364/200 |
| 3,938,097 | 2/1976 | Niguette, III | 364/200 |
| 4,145,745 | 3/1979 | Bijl et al. | 364/200 |
| 4,217,640 | 8/1980 | Porter et al. | 364/200 |
| 4,442,487 | 4/1984 | Fletcher et al. | 364/200 |
| 4,464,712 | 8/1984 | Fletcher | 364/200 |
| 4,467,414 | 8/1984 | Akagi et al. | 364/200 |
| 4,493,026 | 1/1985 | Olnowich | 364/200 |
| 4,495,575 | 1/1985 | Eguchi | 364/200 |
| 4,620,275 | 10/1986 | Wallach et al. | 364/200 |
| 4,654,790 | 3/1987 | Woffinden | 364/200 |
| 4,797,814 | 1/1989 | Brenza | 364/200 |

FOREIGN PATENT DOCUMENTS

0036085 9/1981 European Pat. Off. .
0069250 1/1983 European Pat. Off. .

OTHER PUBLICATIONS

Dixon, J. D. et al., "Working Set Development Through Dual Layered Caching", IBM Technical Disclosure Bulletin, vol. 25, No. 118, pp. 5998–6002.
Fletcher, R. P. and Martin, D. B., "Store Buffer", IBM Technical Disclosure Bulletin, vol. 25, No. 9, pp. 4522–4526.

Primary Examiner—David L. Clark
Attorney, Agent, or Firm—N. Rhys Merrett; James T. Comfort; Melvin Sharp

[57] ABSTRACT

A cache hierarchy to be managed by a memory management unit (MMU) combines the advantages of logical and virtual address caches by providing a cache hierarchy having a logical address cache backed up by a virtual address cache to achieve the performance advantage of a large logical address cache, and the flexibility and efficient use of cache capacity of a large virtual address cache. A physically small logical address cache is combined with a large virtual address cache. The provision of a logical address cache enables reference count management to be done completely by the controller of the virtual address cache and the memory management processor in the MMU. Since the controller of the logical address cache is not involved in the overhead associated with reference counting, higher performance is accomplished as the CPU-MMU interface is released as soon as the access to the logical address cache is completed.

4 Claims, 3 Drawing Sheets

CACHE HIERARCHY DESIGN FOR USE IN A MEMORY MANAGEMENT UNIT

This application is a continuation, of application Ser. No. 636,190, filed July 31, 1984 now abandoned.

BACKGROUND OF THE INVENTION

1. Field of the Invention

This invention relates to improvements in computer memory systems, and more particularly to improvements in cache memories associated with computer memory systems.

2. Background Information

As set forth in a survey of some aspects of cache memory design by A. J. Smith, "Cache Memories", *Computing Surveys*, Vol. 14, No. 3, Sept., 1982, pp. 473-530, cache memories are small high speed memories used in modern, medium and high speed computers to temporarily hold those portions of the contents of main memory which are believed to be currently in use. Since instructions and data in cache memories can usually be referenced in 10 to 25 percent of the time required to access main memory, cache memories permit the execution rate of the machine to be substantially increased.

Thus, a central processing unit (CPU) of a computer with a cache memory needs to spend far less time waiting for instructions and operands to be fetched and/or stored. For example, in typical large, high-speed computers (e.g., Amdahl 470V/7, IBM 3033), main memory can be accessed in 300 to 600 nanoseconds, whereas information can be obtained from a cache in 50 to 100 nanoseconds. Since the performance of such machines is already limited in instruction execution rate by cache memory access time, the absence of any cache memory would produce a substantial decrease in execution speed.

Virtually all modern large computer systems have cache memories; for example the Amdahl 470, the IBM 3081, 3033, 370/168, 360/195, and Univac 1100/80, and the Honeywell 6/80. Also, many medium and small size machines have cache memories; for example the DEC VAX 11/780, 11/750 and PDP-11/70, and the Apollo, which uses a Motorolla 68000 microprocessor. Even microcomputers benefit from an on-chip cache, since on-chip access times are much smaller than off-chip access times.

The success of cache memories has been explained by reference to the "property of locality". The property of locality has two aspects, temporal and spatial. Over short periods of time, a program distributes its memory references nonuniformly over its address space, and which portions of the address space are favored remain largely the same for long periods of time. This first property, called temporal locality, or locality by time, means that the information which will be in use in the near future is likely to be in use already. This type of behavior can be expected from program loops in which both data and instructions are reused. The second property, locality by space, means that portions of the address space which are in use generally consist of a fairly small number of individually contiguous segments of that address space. Locality by space, then, means that the loci of reference of the program in the near future are likely to be near the current loci of reference. This type of behavior can be expected from common knowledge of programs: related data items (variables, arrays) are usually stored together, and instructions are mostly executed sequentially. Since the cache memory buffers segments of information that have been recently used, the property of locality implies that needed information is also likely to be found in the cache.

Optimizing the design of a cache memory generally has four aspects:

(1) Maximizing the probability of finding a memory reference's target in the cache (the hit ratio);

(2) minimizing the time to access information that is indeed in the cache (access time);

(3) minimizing the delay due to a miss; and (4) minimizing the overheads of updating main memory, maintaining multicache consistency, etc.

All of these have to be accomplished under suitable cost constraints, of course.

Reference is made particularly to M. Badel, et al, "Performance evaluation of a cache memory for a minicomputer," *Proc. 4th Int. Symp. on Modelling and Performance Evaluation of Computer Systems*, Vienna, Austria, Feb., 1979; H. Barsamian, et al, "System design considerations of cache memories,", *Proc. IEEE Computer Society Conference*, IEEE, New York, pp. 107-110 (1972); D. H. Gibson, "Consideration in block-oriented systems design," *Proc. Spring Jt. Computer Conf.*, Vol. 30, Thompson Books, Washington, D. C. pp. 75-80 (1967); and K. R. Kaplan, et al, Cache-based computer systems, *IEEE Computer*, Vol. 6, No. 3, pp. 30-36 (Mar., 1973). *See also*, D. W. Clark, et al., "The memory system of a high performance personal computer", *IEEE Trans. Comput.*, Vol. TC-30, No. 10, pp 715-733 (Oct., 1981), which discusses the design details of a real cache. *See also*, B. W. Lampson, et al., "A processor for a high-performance personal computer," Proc. 7th Annual Symp. Computer Architecture, ACM, New York, N. Y., pp. 146-160 (May 6-8).

Figure 1:
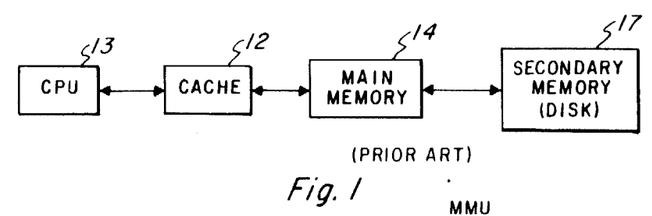
FIG. 1 is a block diagram illustrating the relationship of a cache memory to a CPU and main and secondary memories in accordance with the prior art.

The relationship of a memory cache to the CPU and memory in a computer system of the prior art is shown in the block diagram of FIG. 1. Thus, as shown, a cache memory 12 is ordinarily located between the CPU 13 and main memory 14. A secondary memory 17, such as a disk memory or the like, may also be included, connected to the main memory 14, as shown.

In many main-frame computers, as well as minicomputers with virtual memory, the cache is addressed by real addresses, rather than virtual addresses. Examples of such computers are Amdahl 470, IBM 3081, Univac 1100/80, Honeywell 66/80, DEC VAX 11/780, 11/750. This is so, because these computers have multiple virtual address spaces, typically one per process. For example, the operating system has its own virtual address space, separate from those used by the user processes. In such machines, the same virtual addresses in different virtual spaces are mapped onto different physical addresses; on the other hand, different virtual addresses in different address spaces may be mapped onto the same physical address (in fact, this is the mechanism to allow sharing of information between two different virtual address spaces).

If the cache is addressed with virtual addresses in machines with multiple virtual address spaces, the cache mapping mechanism becomes very complex, because the mapping mechanism also has to keep track of the address space. As a result, most of these older generation machines, first map the virtual address onto the real address, before accessing the cache map. Usually, the virtual to real address translation process is time consuming, compared to the cache access time, and can become a performance bottleneck.

Because of the multiple virtual address space problem, only a few computers with virtual memory have virtual address caches. Examples of such computers are the MU-5, the S-1, the IBM 801, and the ICL 2900. The virtual address cache design is discussed by S. Bederman, "Cache management system using virtual and real tags in the cache directory", *IBM Tech. Disclosure Bull.*, Vol. 21, No. 11, p. 4541 (Apr., 1979) and by A. G. Olbert, "Fast DLAT load for V=R translations, *IBM Tech. Disclosure Bull.*, Vol 22, No. 4, p. 1434, (Sept., 1979). As will become apparent, the invention is particularly suitable for use in conjunction with computer systems such as those described in copending United States patent applications by Oxley et al, entitled "COMPUTER MEMORY SYSTEM", Ser. No. 630,476, filed July 12, 1984, and by Thatte el al., entitled "COMPUTER SYSTEM ENABLING AUTOMATIC MEMORY MANAGEMENT OPERATIONS", Ser. No. 630,478, filed July 12, 1984, said applications being assigned to the assignee hereof, and incorporated herein by reference.

As its name implies, the logical address cache is addressed by logical addresses generated by the CPU. As described in said copending patent application Ser. No. 630,476, a logical address is a pair, (r index), where "r" is the identification of a binding register and "index" is the index of a cell in the memory block bound to the binding register, r. Since none of the existing machines have the notion of logical addresses, they do not have caches that can be addressed by logical addresses.

SUMMARY OF THE INVENTION

In light of the above, therefore, it is an object of the invention to provide an improved cache memory system for use in a computer memory management system.

It is another object of the invention to provide a logical address cache for use in such computer memory system.

It is still another object of the invention to provide a logical address cache of the type described which can be used in conjunction with a virtual address cache in such a computer memory system.

It is yet another object of the invention to provide an improved method and apparatus for handling reference count management apart from the logical address cache, to relieve the logical address cache from this overhead and improve the performance of the memory system with which it is associated.

These and other objects, features and advantages will become apparent to those skilled in the art from the following detailed description when read in conjunction with the accompanying drawings and appended claims.

As mentioned, the logical address cache is addressed by logical addresses generated by the CPU. As described in said copending patent applications Ser. Nos. 630,476, and 630,478, a logical address is a pair, (r index), where "r" is the identification of a binding register and "index" is the index of a cell in the memory block bound to the binding register, r.

The cache system, in accordance with the invention, is incorporated in the MMU, as described in said copending patent applications Ser. Nos. 630,476, and 630,478, can be implemented using a combination of two of the three mechanisms, the "logical address cache," the "virtual address cache," and the "real address cache." The logical address cache allows cache accesses with the least time delay between the generation of a logical address by the CPU and the access to the addressed information from the cache, because the index in a logical address, (r index), is used to access the cache, and no translation from the logical to virtual address is required.

The virtual address cache is addressed by virtual addresses obtained by translating logical addresses, and is computed from the logical address, (r index), by adding the index to the base virtual address stored in the binding register, r. The real address cache is addressed by real addresses, obtained by translating virtual addresses to real addresses.

The real address is obtained by mapping the virtual addresses by an address translation mechanism, such as a page table. In comparison to the logical address cache, the real address cache suffers the worst time delay, as two address translations (the logical to virtual and the virtual to real address translations) are necessary before the real address cache can be accessed.

In accordance with a broad aspect of the invention, a memory system for association with a CPU includes a memory management unit and a main memory. The memory management unit includes a binding register unit for interfacing the main memory to the CPU, and includes means comprising a plurality of binding registers for translating logical and virtual addresses between the CPU and the main memory. Each logical address includes a register pair (r, index), wherein "r" represents a binding register identifier and "index" represents an index of a cell in a memory block bound to the binding register indicated by "r". The binding register unit also includes a logical address cache to which logical addresses are applied, and responsive to which the logical address cache provides selected information cached therewithin. A virtual address cache provides selected information cached therewithin in response to virtual addresses applied to it. Means are provided for translating virtual addresses to real addresses for application to the main memory, and a memory management processor controls the operation of the memory management unit.

The logical address cache comprises a cache memory, a cache map and a binding resolution map. The cache map, as well as the cache memory are divided into partitions, corresponding to the number of binding registers of the memory system. The binding resolution map receives a binding register identification of the contents of its entry point to a cache map partition and a cache partition. Means are also provided for indicating a cache hit or a miss upon the application of a logical address to the cache map.

The virtual address cache comprises a cache memory and a cache map. The cache map receives a portion of the virtual address translated from the logical address and produces a cache hit or miss indication.

BRIEF DESCRIPTION OF THE DRAWINGS

The invention is illustrated in the accompanying drawings in which.

In the various figures of the drawings, like reference numerals are used to denote like or similar parts.

DETAILED DESCRIPTION OF THE PREFERRED EMBODIMENTS

The invention combines the advantages of logical and virtual address caches by presenting a cache hierarchy that consists of a logical address cache backed up by a virtual address cache. The goal is to achieve the performance advantage of a large logical address cache, and the flexibility and efficient use of cache capacity of a large virtual address cache, by employing a physically small logical address cache combined with a large virtual address cache.

It is believed that the concept and use of a logical address cache is also unique in its own right, as no known existing computers use a logical address cache. The virtual address cache is backed up by the main memory. The cache hierarchy does not include a real address cache for reasons explained above.

Figure 2:
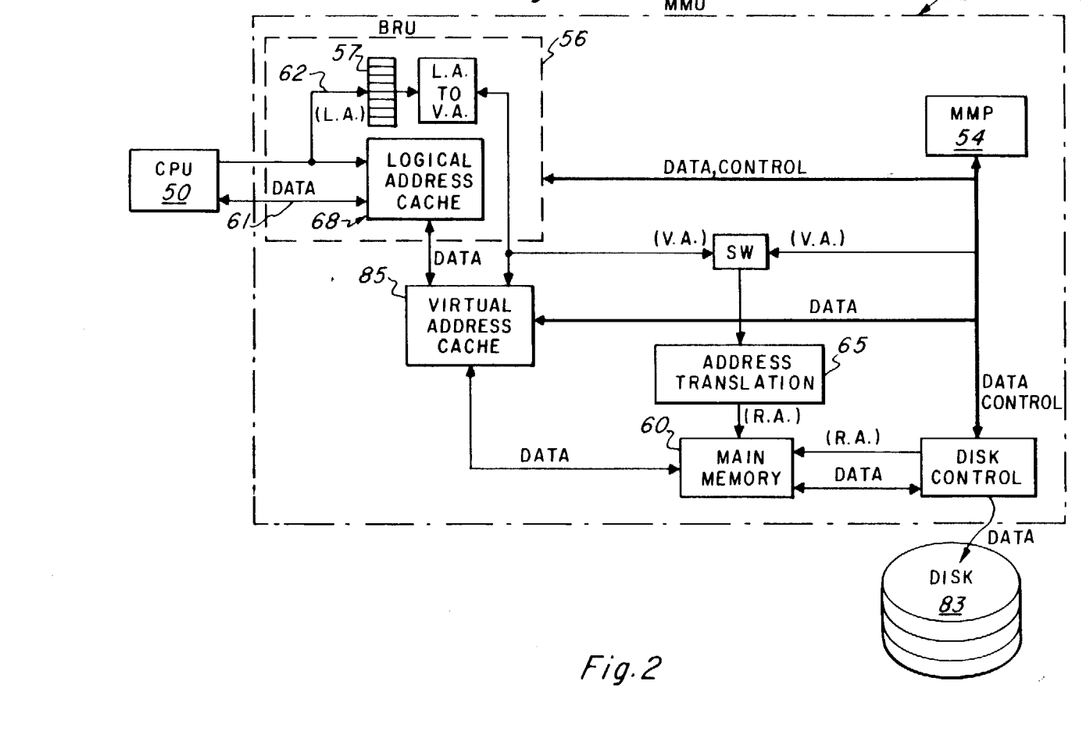
FIG. 2 is a block diagram of a computer system incorporating the cache hierarchy in accordance with the invention.

The logical and virtual address caches, in accordance with the invention are shown in FIG. 2 in the context of a computer system of the type described in the above referenced Oxley et al. patent application Ser. No. 630,476. As shown, a CPU 50 has an associated memory management unit (MMU) 52. The MMU 52 includes a memory management processor (MMP) 54 which controls the MMU functions, all as described in said Oxley et al. patent application. A binding register unit (BRU) 56, containing a plurality of binding registers 57 interfaces the CPU 50 and main memory 60 via respective data and logical address lines 61 and 62. The logical addresses (L. A.) applied to the BRU 56 are translated in the BRU to virtual addresses (V. A.), and, in turn, the virtual addresses developed are translated by an address translation mechanism 65 into real addresses (R. A.) for addressing the main memory 60. As will be described in detail below, the BRU 56 includes a logical address cache 68, in accordance with the invention, and the MMU itself includes a virtual address cache 85 between the BRU 56 and the main memory 60.

As described above, and as will become more fully apparent, the logical address cache 68 is addressed by logical addresses generated by the CPU 50. A logical address consists of an address pair, (r index), where "r" is the identification of a binding register and "index" is the index of a cell in a memory block bound to the binding register, r. In the logical address cache organization, the index part of the logical address is used to address the cache. (A virtual address is not required to address the logical address cache, avoiding the performance penalty inherent in the computation of a virtual address from the logical address.)

Figure 3:
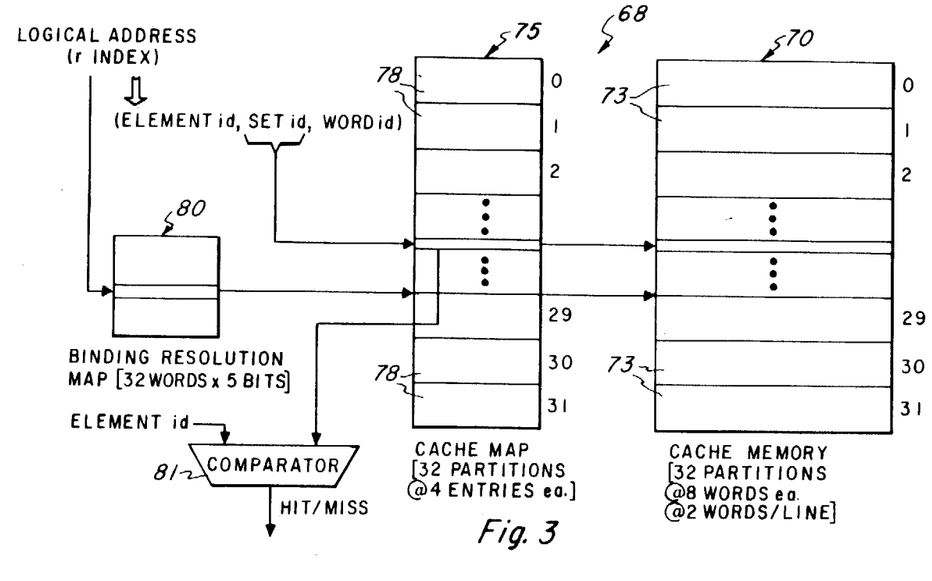
FIG. 3 is a block diagram of a logical address cache which can be used in the computer system of FIG. 2, in accordance with the invention.

An example of the logical address cache 68 is shown in greater detail in the block diagram of FIG. 3. The logical address cache 68 includes a cache memory portion 70 which is divided into a number of partitions 73. The number of cache partitions 73 equals the number of binding registers in the system, for example, 0 through 31, as shown. Each cache partition 73 is used to cache a memory block (or a portion of it), which is bound to one or more of the binding registers 57. Thus, a cache partition is associated with a binding register, and it caches the block bound to that binding register. A cache map 75 is provided which keeps a record of information present in the cache memory 70. The cache map 75 also is divided into partitions 78, each of which is associated with a respective partition 73 of the logical cache memory 70. Therefore, there are as many cache map partitions 78 as there are memory cache partitions 73, which equal the number of binding registers. Each cache map partition 78 indicates which locations of the cached block are present in the associated cache partition 73. If two or more binding registers are bound to the same block, they are associated with a single cache partition, the one that is caching that block.

In addition to the cache map 75, another map, called the binding resolution map 80 is provided to maintain a mapping between a binding register and the logical address cache partition associated with it. The map 80 has as many entries as there are binding registers in the machine. Thus, given the identification of a binding register, the binding resolution map 80 indicates the identification of a cache partition associated with the binding register, if any. Since a cache map partition 78 is associated with each cache partition 73, given the identification of a binding register, the binding resolution map 80 also indicates the identification of a cache map partition 78 associated with the cache partition 73.

As will become apparent, a portion of the index part of the logical address applied to the logical address cache (the "set-id" portion) is contained in the cache map 75. When the binding resolution map 80 is addressed, the contents of the partition of the cache map indicated by the binding resolution map 80 is compared in a comparator 81 with the "element-id" portion of the index part of the logical address to indicate a cache hit or cache miss.

This strategy of managing the logical address cache 68 by means of the binding resolution map 80 avoids multicache consistency problems that could arise were the cache design to use a separate cache partition for each binding register. An additional advantage of this strategy is that the cache design allows a "warm" cache to be created when a new binding is created for an existing block. When a new binding to an existing block is created, at least a part of the existing block is present in the cache partition associated with the binding register to which the existing block is already bound. Thus, during the process of binding, a different binding register to the existing block, the new binding register is associated with the same cache partition in which at least a part of the existing block is present. For example, if a block is already bound to a binding register, say binding register number 3, then the third entry of the binding resolution map would indicate the third cache partition to be caching the block. If a new binding to this block is then created in another binding register, say binding register number 5, then the fifth entry of the binding resolution map would indicate the third cache partition. This effectively creates a warm cache for binding register 5.

An alternate strategy of managing the logical address cache is to assign a separate cache partition for each binding register. In such a strategy, a block bound to multiple binding registers will exist in different cache partitions at the same time. An update of one partition would make the other partitions caching that block out dated, giving rise to multicache consistency problems.

This strategy is of secondary preference, because it raises problems of multicache consistency.

With reference again to FIG. 3, an example of the logical address cache 68 can be as follows.

The index specified in a logical address can be viewed as consisting of three fields, namely, the word id, set id, and element id. This is illustrated in Table 1. (An index is assumed to be 32 bits in width.)

TABLE 1

| | 32 | |
|---|---|---|
| Element id | Set id | Word id |
| e | s | w |

Note that (e + s + w) = 32.

The word identification (specified by the w least significant bits in the offset) specifies a word in a cache line consisting of $2^w$ words. (A line is the unit of data transfer between the cache and the backing store. A line is transferred between cache and backing memory to serve a cache miss.) If a line contains only a single word, w will be 0. Typical values for parameter w are 0, 1, and 2, which will result into a line size of 1, 2, and 4, respectively.

The next s bits in the offset specify the set id. If a fully associative mapping is followed, s will be 0. The set identification specifies a set out of the total $2^s$ possible sets. Typical values for parameter s, are 1, 2, or 3, which will result into a set size of 2, 4, or 8 lines, respectively.

The degree of set associativity, d, is the next parameter to consider. Note that the parameter d is not a field in the index, and hence not shown in Table 1. Typical values for the degree of set associativity, are 1 or 2. Degree=1, will result in the so called direct mapping.

The last parameter, element id, really specifies how many lines of the backing memory are mapped in each set. An e bit wide element identification will specify a line out of the $2^e$ lines, which is to be mapped in the set specified by the set id. If the degree of set associativity is d, then at most d lines out of the $2^e$ lines can be present in the set. If d=1, i.e., the direct mapping, at most one line can be present in the set. Typical values of e are 27, 28, or 29.

The example will also be used to illustrate the details of cache mapping and operation of the logical address cache. The Write-through policy (discussed below) is assumed. The design parameters of the cache are given below.

Line size=2 (w=1)
Number of sets=4 (s=2)
Degree of set associativity=1 (This is direct mapping)
Number of elements per set=$2^{29}$ (e=29)

Thus, the size of each cache partition 73 is 2×4=8 words. Since there are 32 partitions, the total size of the cache is 256 words. The cache is made up of high speed static RAMs or a register file. The cache controller consists of a cache map 75, a binding resolution map 80, and associated control logic (not shown).

The cache map 75 contains 32 partitions, each managing a fixed size cache partition of 4 lines. Thus, each cache partition has 4 entries, and each entry is at least 29 bits wide. It should be noted that the size of each cache map partition matches the number of sets, and the width of each entry in a cache map partition is at least that of the element identification. The entries may have additional bits to record various control information.

The binding resolution map 80 contains 32 words, each of 5 bits. This map is addressed using the binding register identification, r, of a logical address (r index), as the address. The 5-bit contents of the word thus addressed indicates the identification of the partition of the cache map as well as the identification of the cache partition to be used.

The indicated cache map partition is addressed by means of the set-id, i.e., by the (2:1) bits of the index. The contents of the cache map partition thus addressed are compared with the element-id, i.e., with bits (31:3) of the index. If the comparison indicates a match, there is a cache hit, otherwise a cache miss. It should also be noted that as the cache map 75 is addressed, the cache partition is also addressed by means of the set-id, i.e., by the (2:1) bits of the index. If there is a cache hit, output of the cache partition indicates the output of the logical address cache. The cache output contains a line of two words. The word from the line is selected by using the word-id, which is bit (0) of the index.

As described earlier, the primary source of accesses to the logical address cache 68 is the CPU 50. However, during the process of garbage collection the MMP 54 also accesses the logical address cache. During garbage collection, the MMP 54 moves memory blocks from the OLDSPACE to the NEWSPACE in the virtual address space (OLDSPACE and NEWSPACE are described in detail in copending patent application by Bartley et al, entitled COMPUTER MEMORY SYSTEM WITH PARALLEL GARBAGE COLLECTION INDEPENDENT FROM AN ASSOCIATED USER PROCESSOR, Ser. No. 636,187, filed Jul. 31, 1984,assigned to the assignee hereof and incorporated herein by reference. Since the block is moved in the virtual address space, and not in the logical address space, the block itself need be moved only in the virtual address cache 85, described below, and not in the in the logical address cache 68. This is an advantage of the logical address cache over the virtual address cache.

Any pointers to the block being moved, which may exist in other blocks must be updated in both caches. If a block holding a pointer to a moved block is in the logical address cache, the cache location holding this pointer must also be updated with the new pointer (i.e., the new virtual address of the moved block). The MMP 54 knows the virtual address of the source block holding the pointers to a moved block. The MMP 54 searches the binding registers 57 to find out if any register(s) is bound to a source block. This search can be performed at a high speed if there is associative search hardware support (not shown) for the binding registers 57. If there are binding registers bound to a source block, the MMP 54 accesses the logical address cache partition associated with the binding register (bound to the source block) using the index corresponding to the word that contains the old pointer. If that word is in the cache partition, the MMP 54 updates the word using the new virtual address of the moved block. It is expected that most blocks will have only a few outstanding pointers to it in other blocks. So the MMP 54 may have to update only a few pointers in the logical address cache, only if the source block happens to be in the logical address cache 68.

There are some disadvantages of the logical address cache 68 which are now pointed out. Partitioning the cache into fixed size partitions may result in a poor hit ratio, or an inefficient use of the cache capacity. Accesses to a block which is too large to fit in a cache partition may suffer from a poor hit ratio, while other cache partitions may not be in use at all. On the other hand, very small blocks may waste cache capacity, as they can fit in a small portion of a cache partition. Thus, the problem arises whenever there is a mismatch between the size of the memory block being cached, and the size of the cache partition.

The logical address cache 68 should be implemented close to the binding registers 57 to avoid performance loss, because cache partitions are closely associated with binding registers. Similarly, the control of the logical address cache 68 is closely linked with that of the binding registers 57. If the CPU 50 is implemented with very large scale integrated (VLSI) technology, it is anticipated that the binding registers 57 and the logical address cache 68 will also be implemented on the same CPU VLSI chip (not shown). Because of space limitations such a chip is expected to accommodate only a small to moderate size logical address cache. Expected cache size permitted by current estimates of chip area is about 256 words, i.e., 8 words per cache partition assuming 32 binding registers in the machine. As the technology progresses, the cache size is expected to increase to as much as 1,024 words; however, this would still be a moderate size cache. Thus, a drawback of logical address cache imposed by technological restrictions is its small size, which may partly reduce its inherent speed advantage due to poor hit ratio attributed to small size.

Figure 4:
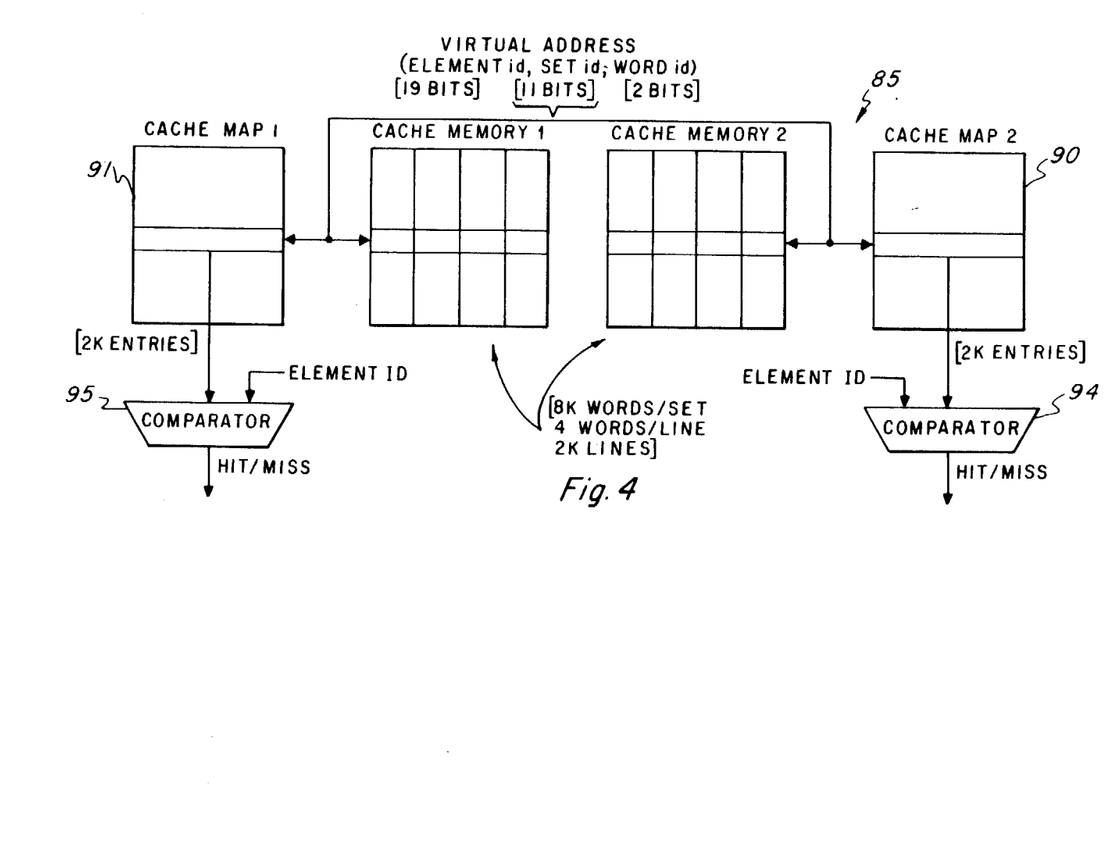
FIG. 4 is a block diagram of an example of a virtual address cache for use in conjunction with the logical address cache of FIG. 3 in the computer system of FIG. 2, in accordance with the invention.

In addition to the logical address cache 68 constructed as described above, a virtual address cache 85 is provided between the binding register unit 56 and the main memory 60. The virtual address cache 85 is illustrated in FIG. 4. The logical address generated by the CPU 50, i.e., the (r, index) pair, is used to calculate the virtual address shown at the top of the figure by adding the virtual address stored in the binding register r of the figure by adding the virtual address stored in the binding register r of the binding register set 57, to the index. The resulting virtual address is used to access the virtual address cache 85. This calculation entails reading of virtual address from the binding register r first, followed by the addition of the virtual address to the index. The entire calculation of the virtual address is expected to take at least 60 nanoseconds (20 nanoseconds for reading the binding register, and 40 nanoseconds for adding the virtual address read to the index), disadvantageously increasing the cache access time by at least 60 nanoseconds.

There are some advantages of the virtual address cache 85. In the virtual address cache 85, the entire cache is available for each binding register, i.e., full cache capacity can be exploited, and there is no restriction on sharing cache capacity among different binding registers. This is in contrast to the logical address cache partition scheme, which may show poor performance or inefficient use of cache capacity when there is a severe mismatch between the size of memory block being cached and the size of the cache partition.

An advantage enjoyed by the virtual address cache 85 is, unlike the case with the logical address cache 68, there is no technology imposed restriction on it size. Off-the-shelf, high speed, static random access memory (RAM) chips (not shown) can be used to implement moderate to large size virtual address cache.

Other advantage of the virtual address cache is its simpler control mechanism compared to that for the logical address cache. There are large scale integrated LSI chips available (such as Texas Instruments TMS 2150 cache controller chip) that make the design of a cache controller relatively simple and inexpensive. Based on such a chip, a cache controller for the virtual address cache can be constructed to manage a fairly large size (16K words) virtual address cache.

Table 2 summarizes the advantages and disadvantages of logical and virtual address caches.

TABLE 2

| Comparison of logical and virtual address cache | |
|---|---|
| Logical address cache | Virtual address cache |
| Lowest delay to cache access, as the index in (r index) is used to access the cache | Moderate delay to cache access due to the translation from logical to virtual address |
| Low activity during garbage collection, as blocks are moved in the virtual address space | High activity during garbage collection, as blocks are moved in the virtual address space |
| Potentially poor hit ratio for large size blocks. Inefficient use of cache capacity. Poor flexibility in sharing the cache capacity | Efficient use of cache capacity |
| Small cache size due to technological restrictions | Moderate to large cache size |
| Complex control | Simple control |

With reference once again to FIG. 4, an example of the virtual address cache 85 and the details of cache mapping and operation is as follows. Again, the Write-through policy is assumed.

The virtual address cache 85 is addressed by the virtual address developed in the BRU 56. The virtual address is defined for purposes herein to have three fields, viz., the word id, the set id and the element id, for the purpose of virtual address cache access. The design parameters of the cache are given below.

Line size = 4 (w = 2)
Number of sets = 2,048 (s = 11)
Degree of set associativity = 2
Number of elements per set = $2^{19}$ (e = 19)

The total size of the cache is $2 \times 2048 \times 4 = 16K$ words. Each set of the two-way set-associative cache consists of 8K words. The cache is made up of high speed static RAMs. The cache controller consists of cache maps and associated control logic.

There are two virtual address cache maps 90 and 91, one corresponding to each set of the two-way set associative cache. Each map contains 2,048 entries, each at least 19 bits wide. It should be noted that the cache map size matches the number of sets, and the width of each entry is at least that of the element id. The entries may have additional bits to record various control information.

Both cache maps 90 and 91 are addressed by means of the set-id, i.e., by the (12:2) bits of the virtual address. The contents of both cache maps thus addressed are compared with the element-id, i.e., with bits (31:13) of the virtual address in respective comparators 94 and 95. At most one comparison is expected to indicate a match, resulting into a cache hit; if neither comparison indicates a match, then there is a cache miss. Note that as both cache maps are addressed, both sets of the cache are also addressed by means of the set-id, i.e., by the (12:1) bits of the virtual address. If there is a cache hit, output of the selected set of of the cache partition indicates the output of the virtual address cache. The cache output contains a line of four words. The word from the line is selected by using bits (1:0) of the virtual address.

As described earlier, the logical address cache 68 is associated with the binding registers 57. If the location indicated by a logical address, (r index), is in the logical address cache, i.e., if there is a hit on the logical address cache, the location can be either read or written, depending on whether it is a Read or a Write operation. If there a miss on the logical address cache, the virtual address cache is accessed with the virtual address obtained from translating the logical address. If there is a hit on the virtual address cache, the location can be either read or written, depending on whether it is a Read or a Write operation.

If there a miss on the virtual address cache 85, the main memory 60 is accessed with the real address obtained from translating the virtual address by using the address translation mechanism 65. If the address translation mechanism 65 indicates a page fault, then of course the information is on the backing disk storage 83, and the missing page needs to be fetched to serve the page fault.

The logical address cache 68 is primarily addressed by the CPU 50. The virtual address cache 85 is used to serve misses at the logical address cache 68, and it is also addressed by the MMP 54.

A model illustrating the expected performance of the cache hierarchy of the invention is presented below. It should be noted that a low hit ratio of 60% is assumed for the logical address cache due to its expected small size.

| Hit probability for the logical address cache | 60% |
|---|---|
| Hit probability for the virtual address cache | 95% |
| Access time for the logical address cache | 50 ns |
| Access time for the virtual address cache | 100 ns |
| Access time for the main memory | 300 ns |

Therefore, the effective access time for the memory system = { (50 × 0.6) + (100 × 0.4) } × 0.95 + (300 × 0.05) = 82 ns This expected access time should be contrasted with the approach which uses only a logical address cache, or only a virtual address cache. With a larger logical address cache that gives as high as 80% hit ratio, the effective access time=(50×0.8)+(300×0.2)=100 ns. With a single virtual address cache, the effective access time=(100×0.95)+(300×0.05)=110 ns.

Thus, a cache hierarchy consisting of a small logical address cache and a large virtual address cache will deliver a better performance than a single large logical address cache or a single large virtual address cache.

Another feature of the invention is that it allows reference count management to be done completely by the controller of the virtual address cache and the MMP 54 in the MMU 52. Details of reference counting are set forth, for instance, in the above referenced copending patent application Ser. No. 636,187. The controller of the logical address cache is not involved in any overhead associated with reference counting, which results into higher performance as the CPU-MMU interface is released as soon as the access to the logical address cache is over.

The MMU 52 employs reference counting technique for rapid reclamation of inaccessible memory. For each Write instruction, the existing contents of the memory cell must first be read to determine whether a pointer will be destroyed, as a result of writing new data, and then the new data can be written into it. This is called the "Read-modify-write" feature. In the machine of the aforereferenced Oxley et al. patent application Ser. No. 630,476, if the MMU tag of the existing contents indicates a pointer, then a pointer will be destroyed as a result of a Write operation. If an existing pointer is destroyed, then the header of the referent block must be read to retrieve the reference count, the reference count is decremented by one, and finally the updated reference count is stored back in the header of the referent block.

Similarly the new data being written must also be checked to see if it is a pointer. This is determined by inspecting the MMU tag of new data. If the data is a pointer, then a new pointer will be created, which requires that the header of the referent block must be read to retrieve the reference count, the reference count is incremented by one, and finally the updated reference count is stored back in the header of the referent block.

If only a logical address cache is present (i.e., no virtual address cache) then its controller will have to decide whether an existing pointer is being destroyed or a new one is being created, i.e., the controller will have to support the Read-modify-write feature. This overhead will degrade the performance, because until these decisions are resolved the CPU-MMU interface cannot be released. With the cache hierarchy design disclosed herein, the overhead of detecting whether an existing pointer is being destroyed or a new one is being created can be handled by the controller of the virtual address cache, i.e., the controller for the virtual address cache needs to support the Read-modify-write feature. The MMP takes care of actually incrementing and decrementing the reference counts, and reclaiming garbage blocks. As soon as the logical address cache is written with new data in a Write instruction, the CPU-MMU interface is released, allowing the CPU to initiate a new access to memory. As explained later, in order to support this strategy of performance enhancement, it is necessary to employ the "write-through" policy for both caches.

There are two policies to keep the cache consistent with the backing memory. For the logical address cache, the virtual address cache is the backing memory; for the virtual address cache, the main memory is the backing memory. The following discussion applies to both the logical and the virtual address cache. The first policy is called the "Write-through" policy. As its name indicates, for each write access, both cache and the backing memory are written. The second policy is called the "Write-back" policy. As its name implies, the backing memory is written only when existing data in cache is to be replaced to accommodate a newly brought in data from the virtual address cache, and if the existing data is "dirty," i.e., inconsistent with its copy in the backing memory. In the write-through policy, the backing memory is updated and kept consistent with the cache on every write cycle, at the expense of increased traffic to the backing memory.

The cache design presented herein uses the write-through policy for both the logical and virtual address cache. The details of implementation of the write-through policy are well known in the art and are not described in further detail herein. What is emphasized here is the set of reasons for choosing the write-through policy in the context of the MMU.

An advantage of the write-through policy is that both caches need have only error detection (not correction) capability. Upon detecting a cache error, the correct and up-to-date main memory data can be fetched to correct the erroneous cache data. Therefore the cache design becomes simpler, as it need not have error correcting code. A disadvantage of the write-back policy is that at least the virtual address cache must have a single bit error correction capability, as the main memory data cannot be relied upon to correct the cache data errors. This requirement complicates the design of the virtual address cache.

There are additional advantages of the write-through policy. With the write-through policy, cache misses are served faster, as the old line to be replaced is simply overwritten. There is an additional factor that makes logical address cache misses an expensive matter for write-back policy. For the logical address cache, the cache map contains logical address indexes of the lines in the cache. After a cache miss, when a line must be replaced, its logical index must first be translated to virtual address. This translation process requires an addition of two 32-bit numbers, which will take at least 40 nanoseconds.

With the write-through policy, both the virtual address cache, as well as the main memory always have an up-to-date copy; therefore, the job of garbage collector process running in the MMP becomes easier. If a garbage collector is ready to scavenge pointers, it is assured that the pointers are up-to-date. On the other hand, in the write-back policy, before a block can be scavenged, it must first be written back from the logical address cache to the virtual address cache.

With the write-through policy, when a block is deallocated, or becomes garbage, it need not be written back from the logical address cache to the virtual address cache, as the virtual address cache contains a consistent copy. The logical address cache partition corresponding to such blocks is simply deassigned and reinitialized, without having to write it back.

With the write-through policy, the logical address cache need not support the Read-modify-write feature described earlier. The logical address cache will be simply written in response to Write instructions. Because of the write-through policy, the data will also be written in the virtual address cache. It is the virtual address cache (and not the logical address cache), which will have the Read-modify-write feature. As a result of a Write instruction, if a new pointer is created or an old pointer is destroyed, the controller for the virtual address cache will report that event to the MMP, which updates the reference counts appropriately.

Thus, a Write instruction will be over as soon as the data is written in the logical address cache. At this time the CPU-MMU interface can be released so that the CPU can submit the next memory request. This is a faster way of writing the cache, compared to the Read-modify-write cache cycle, which would have been necessary had we chosen the write-back policy.

Although the invention has been described and illustrated with a certain degree of particularity, it should be understood that the present disclosure has been made by way of example only and that numerous changes in the combination and arrangement of parts may be resorted to by those skilled in the art without departing from the spirit and the scope of the invention, as hereinafter claimed.

What is claimed is:

1. A memory system for use with a CPU comprising:
a physical memory;
binding register means having a plurality of registers and coupled between the physical memory and the CPU for constraining the CPU to access only a logical address space with logical addresses generated by the CPU, wherein a logical address includes a reference to one of the plurality of registers;
a logical address cache coupled to said binding register means for receiving logical addresses, and for providing selected information cached therewithin to the CPU if information corresponding to said logical address is stored in said logical address cache;
means coupled to said binding register means for determining whether information corresponding to said logical address is not contained in said logical address cache, and for translating logical addresses into virtual addresses contained in a virtual address space;
a virtual address cache to which virtual addresses are applied when said determining means determines that said logical address is not contained in said logical address cache, wherein said virtual address cache determines whether information corresponding to such applied virtual addresses is stored therein and which provides such information if it is stored in said virtual address cache; and
a virtual address cache controller coupled to said virtual address cache and to said physical memory for determining whether information corresponding to a translated virtual address is contained in said virtual address cache, and for copying information from said physical memory to said virtual address cache if information corresponding to a translated virtual address in not contained in said virtual address cache.

2. The memory system of claim 1 wherein said logical address cache comprises a cache memory, a cache map and a binding resolution map,
said binding resolution map receiving logical address for application to said cache map;
said cache map containing an identification of the contents of the cache memory, means for addressing said cache memory, and means for indicating cache bits and cache misses upon the application of at least a portion of the logical addresses to said binding resolution map, and said cache map having memory elements partitioned so that each partition corresponds to a respective one of said binding registers, wherein each entry in said binding resolution map corresponds to a single one of said binding registers and indicates which partition is to be considered associated with said single one of said binding register.

3. A memory management system for use with a CPU comprising:
a main memory;
a binding register unit coupled to the main memory and the CPU for interfacing the main memory to the CPU, including:
a plurality of binding registers each containing virtual addresses in the main memory, wherein the binding registers are accessed by the application of a logical address to said binding register unit by said CPU;
each logical address including a register pair (r,index), wherein "r" represents a binding register identifier and "index" represents an index of a cell in a memory block identified by the binding register indicated by "r";

and a logical address cache to which said logical addresses are applied, and which provides selected information cached therewithin.

4. The memory system of claim 3 wherein said logical address cache comprises a cache memory, a cache map and a binding resolution map, said binding resolution map receiving said logical addresses for translation to a cache map address applied to said cache map;

said cache map containing identification of the contents of the memory cache, means for addressing said memory cache, and means for indicating a cache hit and a cache miss upon the application of a cache map address applied thereto from said binding resolution map, and said cache memory having memory elements partitioned with each partition corresponding to a respective one of said binding registers, wherein each entry in said binding resolution map corresponds to a single one of said binding registers and indicates which partition has cached information corresponding in said single one of said binding registers.

* * * * *